(12) United States Patent
Hsi

(10) Patent No.: US 8,655,028 B2
(45) Date of Patent: *Feb. 18, 2014

(54) PHOTO SHARING SYSTEM WITH FACE RECOGNITION FUNCTION

(75) Inventor: Chen-Ning Hsi, Taipei (TW)

(73) Assignee: Primax Electronics Ltd., Taipei (TW)

( * ) Notice: Subject to any disclaimer, the term of this patent is extended or adjusted under 35 U.S.C. 154(b) by 205 days.

This patent is subject to a terminal disclaimer.

(21) Appl. No.: 13/397,033

(22) Filed: Feb. 15, 2012

(65) Prior Publication Data

US 2013/0101181 A1    Apr. 25, 2013

(30) Foreign Application Priority Data

Oct. 19, 2011 (TW) .............................. 100137871 A

(51) Int. Cl.
*G06K 9/00* (2006.01)

(52) U.S. Cl.
USPC ........... 382/118; 382/182; 382/190; 382/128; 707/737; 709/203

(58) Field of Classification Search
CPC .......... G06K 9/00268; G06K 9/00302; G06K 2209/27; G06K 2009/00328; G06K 9/78
USPC ........... 382/118, 182, 190; 707/737; 709/203
See application file for complete search history.

(56) References Cited

U.S. PATENT DOCUMENTS

| 2012/0083294 A1* | 4/2012 | Bray et al. ..................... 455/466 |
| 2012/0301032 A1* | 11/2012 | Kawanishi et al. ........... 382/190 |
| 2013/0055079 A1* | 2/2013 | Liao et al. ..................... 715/701 |

\* cited by examiner

*Primary Examiner* — Mike Rahmjoo
(74) *Attorney, Agent, or Firm* — Evan R. Witt; Kirton McConkie

(57) ABSTRACT

A photo sharing system with a face recognition function is provided. The photo sharing system includes a photo browser and a photo sharing platform. The photo browser has a photo classification module for classifying plural photos according to face image contained in the plural photos, thereby generating a photo classification message. The photo classification message contains the photos having the face image of the same person. Moreover, the photo classification message may be transmitted to the photo sharing platform at the same time to be shared to the receiver corresponding to face image. By the photo sharing system, the efficacy of sharing photos will be enhanced.

10 Claims, 6 Drawing Sheets

| Photo | Name | Platform account | E-mail | Phone number | Facebook account |
|---|---|---|---|---|---|
| FA | LI HSIAO-MING | ⋮ | ⋮ | ⋮ | ⋮ |
| FB | WANG TA-TUNG | ⋮ | ⋮ | ⋮ | ⋮ |
| FC | ⋮ | ⋮ | ⋮ | ⋮ | ⋮ |
| FD | ⋮ | ⋮ | ⋮ | ⋮ | ⋮ |
| FE | ⋮ | ⋮ | ⋮ | ⋮ | ⋮ |
| ⋮ | ⋮ | ⋮ | ⋮ | ⋮ | ⋮ |

FIG. 4

PHOTO SHARING SYSTEM WITH FACE RECOGNITION FUNCTION

FIELD OF THE INVENTION

The present invention relates to a photo sharing system, and more particularly to a photo sharing system with a face recognition function.

BACKGROUND OF THE INVENTION

In modern life, various daily activities are recoded by shooting photos to store associated histories of the activities. In addition, a photo sharing method is a way of making contact with friends or family to communicate life experience and emotion.

There are several photo sharing methods for sharing photos to others. For example, the photos may be shared to other persons through e-mail boxes or the photos may be published on personal web pages or social networking websites.

Conventionally, during the process of sharing photos, the photos need to be successively browsed by the user, then the photos to be shared to the same person are stored in a folder, and finally the photos are transmitted to an electronic mail or uploaded to the social networking website. However, if the number of photos and the amount of persons for receiving the shared photos are too huge, the procedures of successively browsing the photos and manually classifying the photos are time-consuming and troublesome.

Therefore, there is a need of providing an improved photo sharing system in order to increase the efficacy of sharing photos.

SUMMARY OF THE INVENTION

The present invention provides a photo sharing system with a face recognition function in order to increase the efficacy of sharing photos.

In accordance with an aspect of the present invention, there is provided a photo sharing system with a face recognition function. The photo sharing system includes a photo browser and a photo sharing platform. The photo browser is included in an electronic device for allowing a user to browse plural photos by operating the electronic device. The photo browser includes a user interface, a photo classification module, and a photo transmission module. The user interface is used for showing the plural photos. The photo classification module is used for classifying the plural photos according to face image contained in the plural photos, thereby generating a photo classification message. The photo classification message includes at least one candidate receiver. At least one photo is selected by the user according to the photo classification message, and transmitted to a specified candidate receiver which is selected by the user. The photo transmission module is used for transmitting the photos. The photo sharing platform is included in a cloud server. The cloud server is in communication with the electronic device through an internet. The photo sharing platform includes a photo file management module and a sharing notification module. The photo file management module is used for managing at least one photo folder, wherein the photos are stored in the photo folder. The sharing notification module is used for generating a photo sharing notice to the receiver.

In an embodiment, the photo browser further includes a browsing history recording module for recording a browsing history of each photo, and the browsing history is transmitted to the photo sharing platform from the photo transmission module. The photo sharing platform further includes a photo recommendation module for gathering statistics and performing analysis on the browsing history of the photo, thereby generating at least one recommendation message. The browsing history includes a name of a person who browses the photo, a number of times the photo is browsed, a time length of browsing the photo in each browsing action, a number of times the photo is downloaded to any electronic device, a name of a folder of any electronic device which stores the photo, and a number of times the photo is re-shared.

In an embodiment, the plural photos are classified by the photo classification module according to face images of persons included in the plural photos.

In an embodiment, if the plural photos are classified by the photo classification module according to the face images of the persons included in the plural photos, the face image of each person and at least one photo containing the face image of the person are shown on the user interface, wherein the face image of each person denotes the candidate receiver.

In an embodiment, when a face image is clicked by the user, at least one photo corresponding to the face image is transmitted from the photo transmission module to the corresponding candidate receiver.

In an embodiment, according to an area percentage of the face image relative to the photo, the photo classification module determines whether the photo is a self-portrait photo or a certificate photo.

In an embodiment, according to the amount of face images of persons contained in each photo, the photo classification module determines whether the photo is an individual photo or a multi-person photo.

In an embodiment, the photo browser further includes a face address book creating module for allowing the user to create a face address book, wherein the face address book includes information about a face image, a name, a telephone number, a user account of the photo sharing platform and plural name-related contact data.

In an embodiment, if the receiver has no user account of the photo sharing platform, the photo sharing notice is sent to the receiver through an electronic mail box, a short message or a social networking website account. Whereas, if the receiver has the user account of the photo sharing platform, the photo sharing notice is shown on a user interface of a photo browser of the receiver.

In an embodiment, when the photo sharing notice is shown on the user interface of the photo browser of the receiver, the photo sharing notice contains a face image of a photo sharer and a face image of the receiver.

In an embodiment, the photo browser further includes a face address book creating module for allowing the user to create a face address book, wherein the face address book includes information about face images, names, telephone numbers and plural name-related contact data.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 4 schematically illustrates a face address book created by the photo sharing system of the present invention;

DETAILED DESCRIPTION OF THE PREFERRED EMBODIMENT

Figure 1:
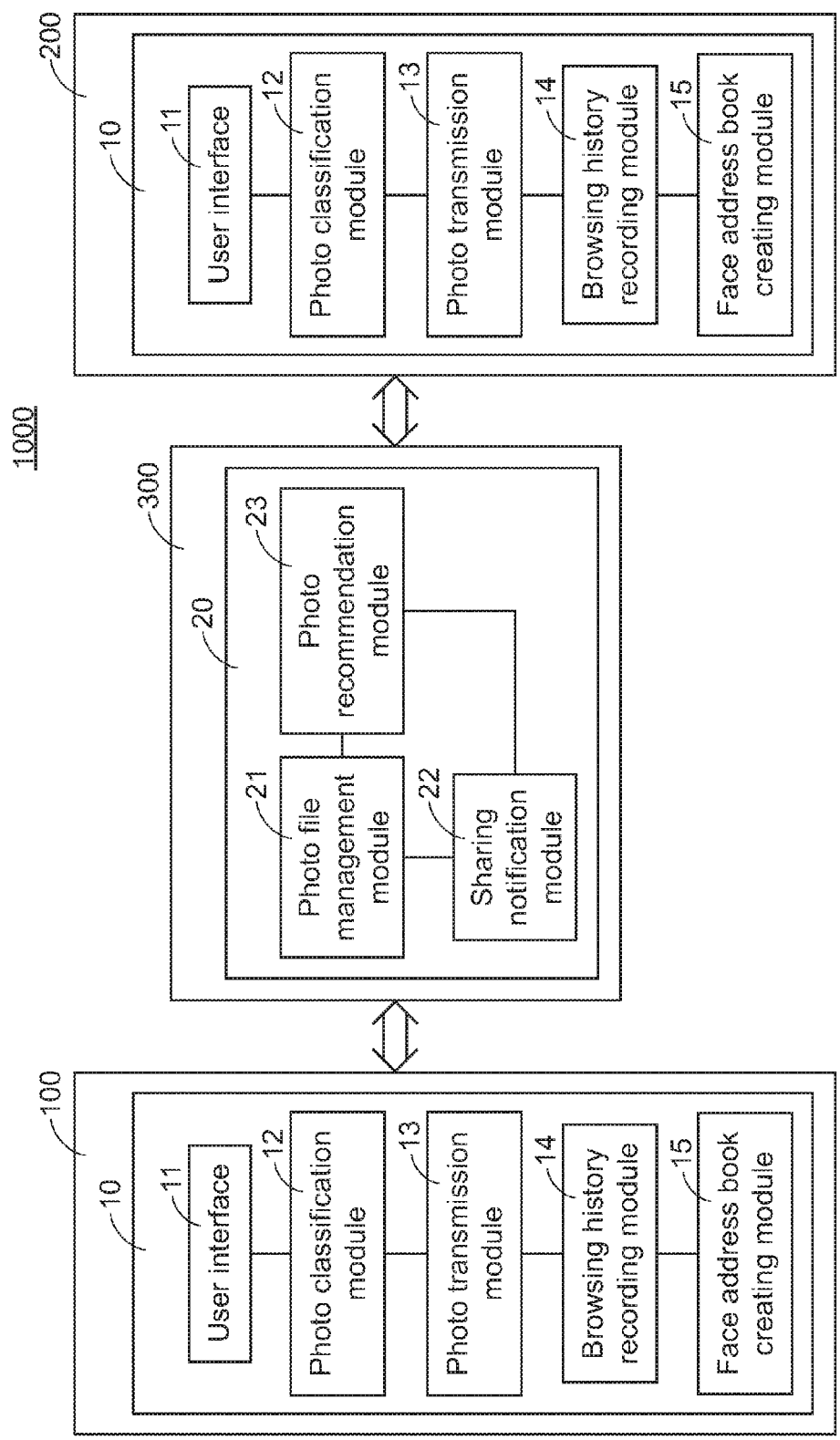
FIG. 1 is schematic functional block diagram illustrating a photo sharing system according to an embodiment of the present invention.

For obviating the drawbacks encountered from the prior art, the present invention provides a photo sharing system with a face recognition function. FIG. 1 is schematic functional block diagram illustrating a photo sharing system according to an embodiment of the present invention.

As shown in FIG. 1, the photo sharing system 1000 comprises a photo browser 10 and a photo sharing platform 20. In this embodiment, the functions of the photo browser 10 and the photo sharing platform 20 are implemented by executing associated application programs. The photo browser 10 is installed in an electronic device 100. The photo sharing platform 20 is installed in a cloud server 300. The photo browser 10 may be also installed in another electronic device 30. In accordance with the present invention, an example of the electronic device includes but is not limited to a desktop computer, a notebook computer, a smart phone, a tablet personal computer, a small television, or the like.

In a case that the photo browser 10 is installed in the electronic device of a user, the electronic device may share photos to the cloud server including the photo sharing platform 20 and another electronic device including the photo browser 10 through the internet.

Please refer to FIG. 1 again. The photo browser 10 is installed in the electronic device 100. Moreover, the photo browser 10 comprises a use interface 11, a photo classification module 12, a photo transmission module 13, a browsing history recording module 14, and a face address book creating module 15. As shown in FIG. 1, the photo browser 10 is also installed in the electronic device 100. The photo sharing platform 20 is installed in the cloud server 300, and comprises a photo file management module 21, a sharing notification module 22, and a photo recommendation module 23.

Figure 2:
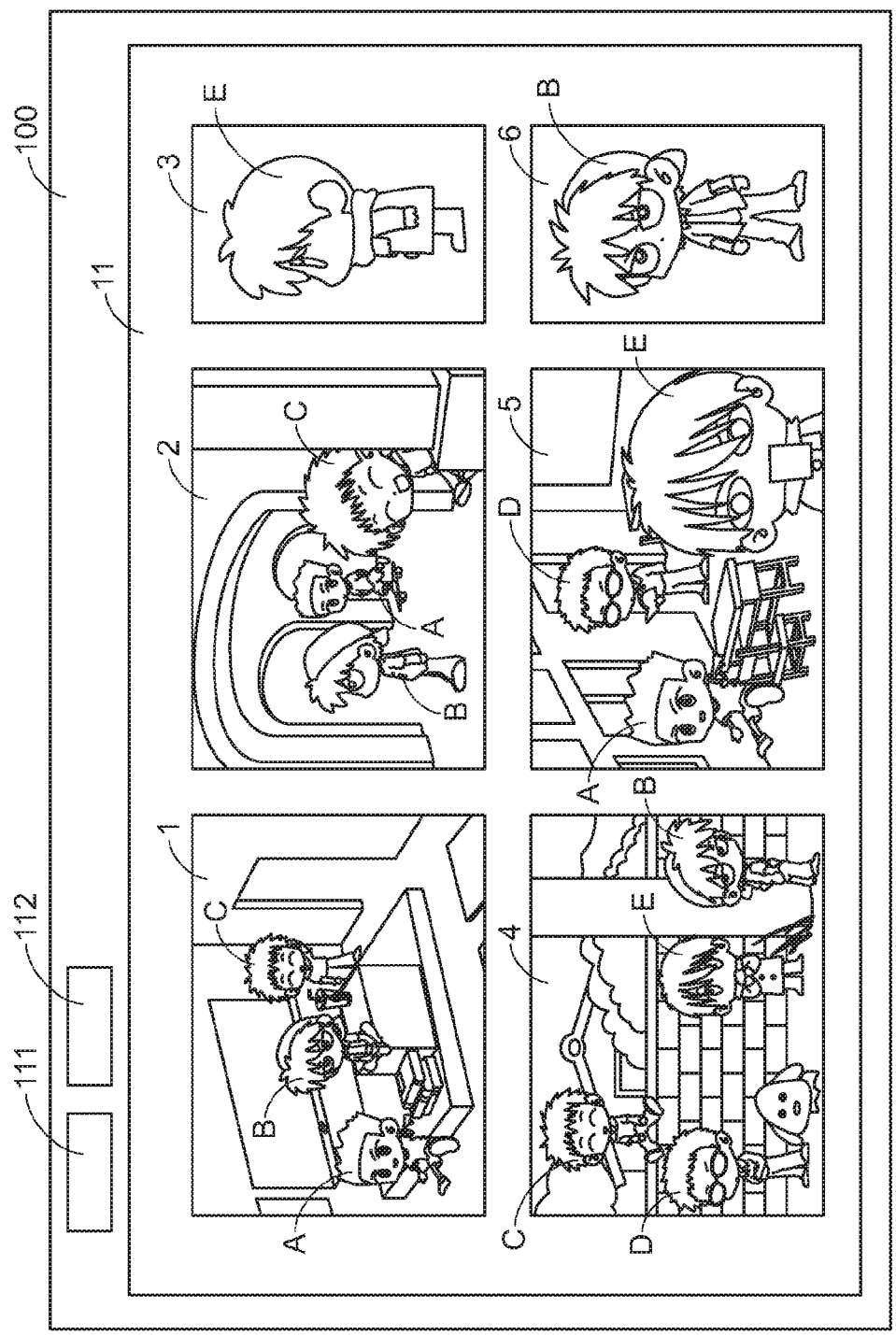
FIG. 2 schematically illustrates plural photos shown on the user interface of the photo sharing system of the present invention.

FIG. 2 schematically illustrates plural photos shown on the user interface of the photo sharing system of the present invention. By operating the photo browser 10 of the electronic device 100, a user interface 11 is displayed on the screen of the electronic device 100. In FIG. 2, six photos with photo numbers 1, 2, 3, 4, 5 and 6 are shown on the use interface 11. Each of photos 1~6 contains the image of at least one of five different persons A, B, C, D and E. In this embodiment, the person A is the photo sharer, and the persons B, C, D and E are four candidate receivers. That is, the person A (i.e. the user) may share the photos 1~6 to the four candidate receivers B, C, D and E. The photo classification module 12 of the photo browser 10 is used for classifying the to-be-shared photos 1~6, thereby generating a photo classification message. In this embodiment, the photo classification module 12 may classify the photos according to two kinds of selective items. For example, the photo classification module 12 may classify the photos 1~6 according to the person or the photo attribute.

Figure 3:
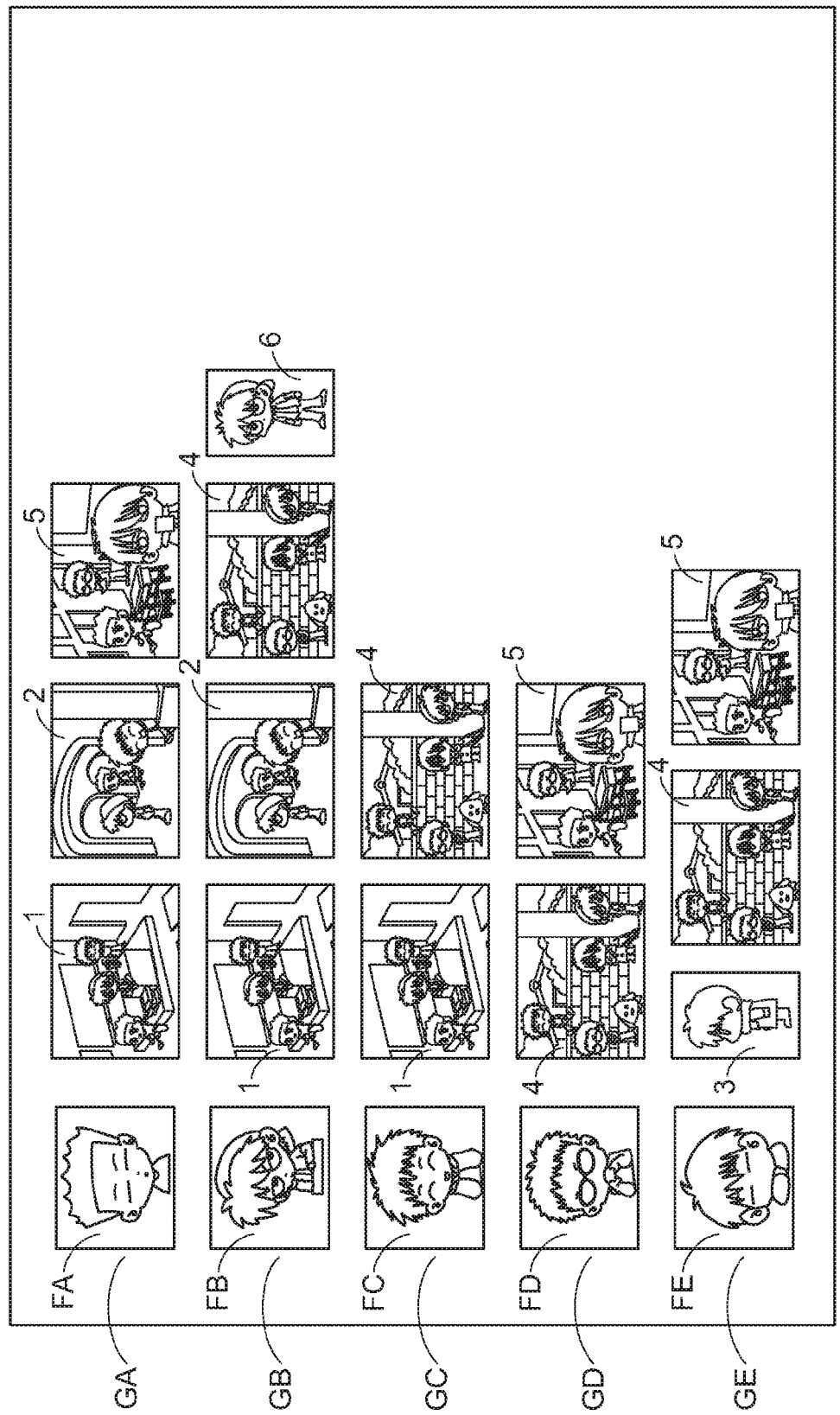
FIG. 3 schematically illustrates a method of classifying photos by the photo sharing system of the present invention.

FIG. 3 schematically illustrates a method of classifying photos by the photo sharing system of the present invention. Please refer to FIGS. 2 and 3. The user interface 11 as shown in FIG. 2 provides two photo classification selective items 111 and 112. By clicking the selective item 111, the photos are classified according to the face image. By clicking the selective item 112, the photos are classified according to the amount of persons. Please refer to FIG. 3. In a case that the selective item 111 is clicked by the user A, the photo classification module 12 will utilize a face recognition technology to classify the photos 1~6 according to the face images of the persons A~E. Consequently, a photo classification message as shown in FIG. 3 is generated. In this embodiment, the photo classification message includes five photo groups GA, GB, GC, GD and GE. The photo group GA denotes the photos including the image of the person A (e.g. the photos 1, 2 and 5). The photo group GB denotes the photos including the image of the person B (e.g. the photos 1, 2, 4 and 6). The photo group GC denotes the photos including the image of the person C (e.g. the photos 1 and 4). The photo group GD denotes the photos including the image of the person D (e.g. the photos 4 and 5). The photo group GE denotes the photos including the image of the person E (e.g. the photos 3, 4 and 5).

The face address book creating module 15 of the photo browser 10 is used for creating a face address book. FIG. 4 schematically illustrates a face address book created by the photo sharing system of the present invention. The face address book includes face images and contact data associated with plural contact persons. As shown in FIG. 4, the contents of the face address book include but are not limited to face images, names, photo sharing platform accounts, e-mail accounts, mobile phone numbers and Facebook accounts associated with the contact persons.

By means of the data of the face address book, the photo classification module 12 may show the face image FA of the person A in front of the photos including the image of the person A (e.g. the photos 1, 2 and 5). The face image FA of the person A may facilitate the user to immediately recognize the persons contained in each photo group. Similarly, the face images FB, FC, FD and FE of the persons B, C, D and E are respectively shown. Moreover, if the data associated with the face image of any person are not contained in the face address book, after the classifying operation is completed by the photo classification module 12, an inquiring message is generated to inquire the user whether the data associated with the face image of this person will be created or not.

Please refer to FIG. 3 again. After the classifying operation is completed, the face images of the persons included in the photos of each photo groups will be shown. Consequently, the user may clearly realize the candidate receivers corresponding to the plurality of browsed photos and the photos to be received by the corresponding candidate receivers. Then, the user may determine whether the photos will be transmitted to the candidate receivers or not. For example, if the user wants to share photos to the persons B and D, the user may simply click the face images FB and FC of the persons B and D. In this way, the photo groups corresponding to the persons B and D may be transmitted from the photo transmission module 13 to photo sharing platform 20 according to the user's selection.

Figure 5:
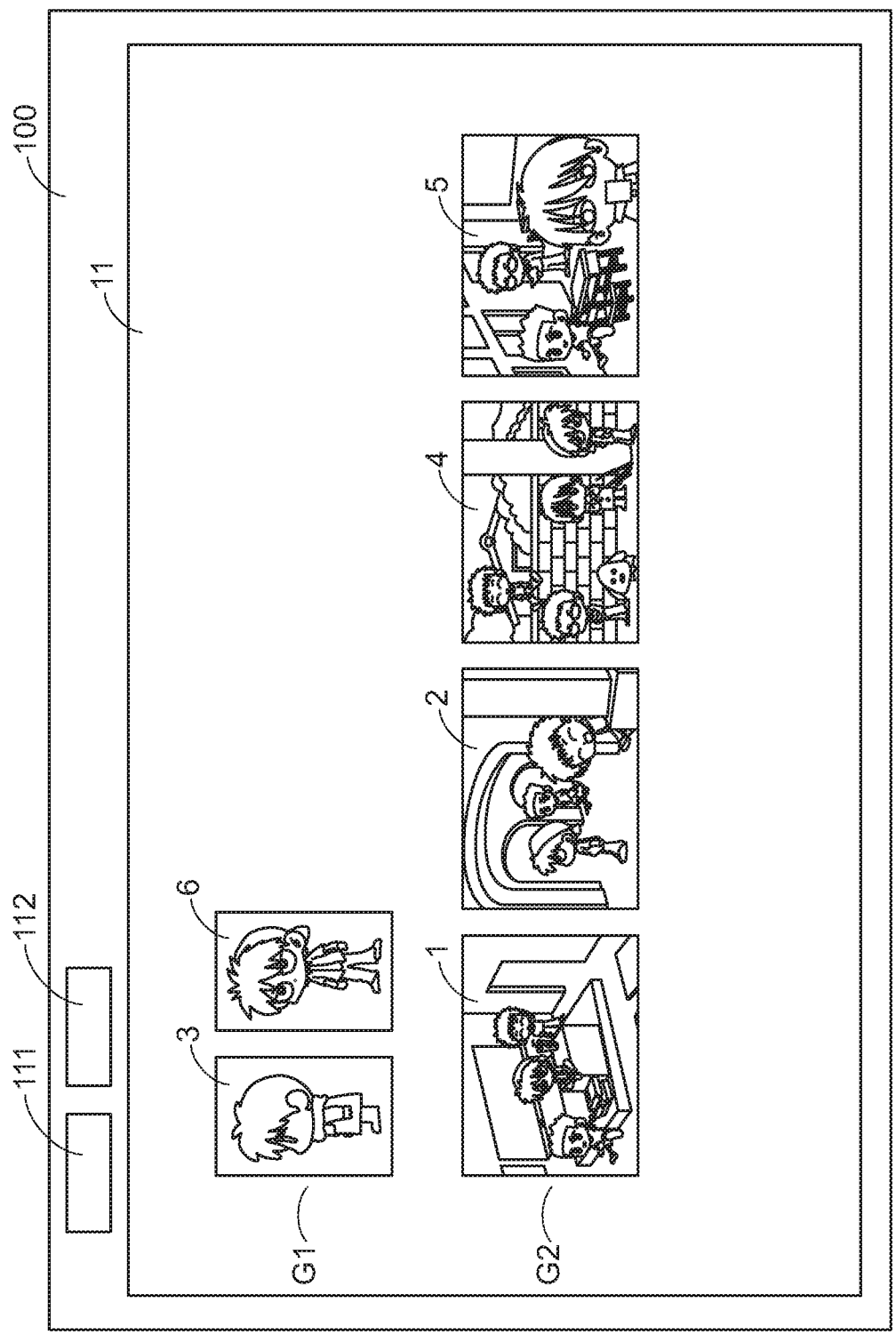
FIG. 5 schematically illustrates a method of classifying photos according to the amount of persons by the photo sharing system of the present invention.

FIG. 5 schematically illustrates a method of classifying photos according to the amount of persons by the photo sharing system of the present invention. As shown in FIG. 5, the photos are classified according to the amount of persons contained in the images of the photos and the area percentage of the face image relative to the photo by the photo classification module 12. That is, the photos shown in FIG. 5 are classified according to the amount of face images and the area percentage of the face image relative to the photo. For example, if the amount of face images contained in a photo is 1 and the area of the face image is greater than one half of the photo area, the photo is considered as an individual photo. After the photo is considered as the individual photo, the photo sharing system will further judge whether the photo has a monochromic color. If the photo has a monochromic color, the photo is considered as a certificate photo used to apply for a certificate. Optionally, according to the area percentage, the photo sharing system may judge whether the photo is a half-length photo or a full-length photo. Optionally, according to the location of the face, the illuminating condition of the face, the orientation of the face and the expression of the face, the photo sharing system may judge whether the photo is a self-portrait photo. Whereas, if the amount of face images contained in a photo is more than 1, the photo is considered as a multi-person photo. According to the amount of face images contained in the photos 1~6, the photos 1~6 may be classified into two groups G1 and G2. The group G1 includes the individual photos, the self-portrait photos or the certificate photos (e.g. the photos 3 and 6). The group G2 includes the multi-person photos (e.g. the photos 1, 2, 4 and 5). Under this circumstance, the user may share only the multi-person photos while the individual photos are not shared.

Figure 6:
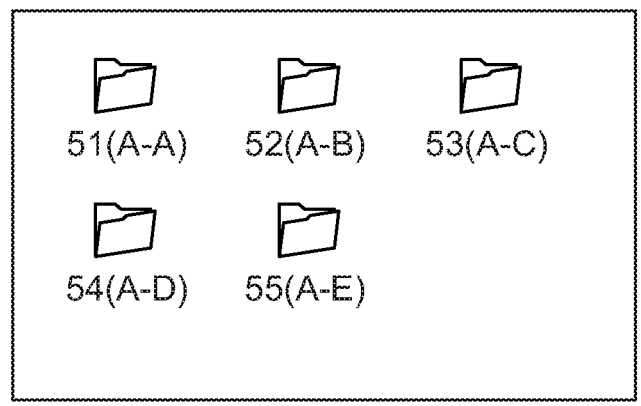
FIG. 6 schematically illustrates the photo folders in the photo sharing platform of the photo sharing system of the present invention.

FIG. 6 schematically illustrates the photo folders in the photo sharing platform of the photo sharing system of the present invention. As shown in FIG. 6, after the to-be-shared photos are transmitted from the photo transmission module 13 to the photo sharing platform 20, the photos are stored in the cloud server 300 through the photo file management module 21. The cloud server 300 has plural photo folders corresponding to respective receivers. For example, as shown in FIG. 6, the photo folder 51 (A-A) indicates that this photo folder is created by the person A and used for storing the photos of the user A. The photo folder 52 (A-B) indicates that this photo folder is used for storing the photos shared to the user B by the user A. Similarly, the photo folder 53 (A-C) indicates that this photo folder is used for storing the photos shared to the user C by the user A. Similarly, the photo folder 54 (A-D) indicates that this photo folder is used for storing the photos shared to the user D by the user A. Similarly, the photo folder 55 (A-E) indicates that this photo folder is used for storing the photos shared to the user E by the user A. Generally, these photo folders are created for these receivers by the photo sharer. In this embodiment, the photo sharer is the user A.

In the above embodiments, since the user wants to share photos to the persons B and D, the photos including the image of the person B (e.g. the photos 1, 2, 4 and 6) will be stored in the photo folder 52 (A-B) and the photos including the image of the person D (e.g. the photos 4 and 5) will be stored in the photo folder 54 (A-D). Of course, the photos including the image of the person A (e.g. the photos 1, 2 and 5) may be stored in the photo folder 51 (A-A) to be served as a backup copy.

Figure 7:
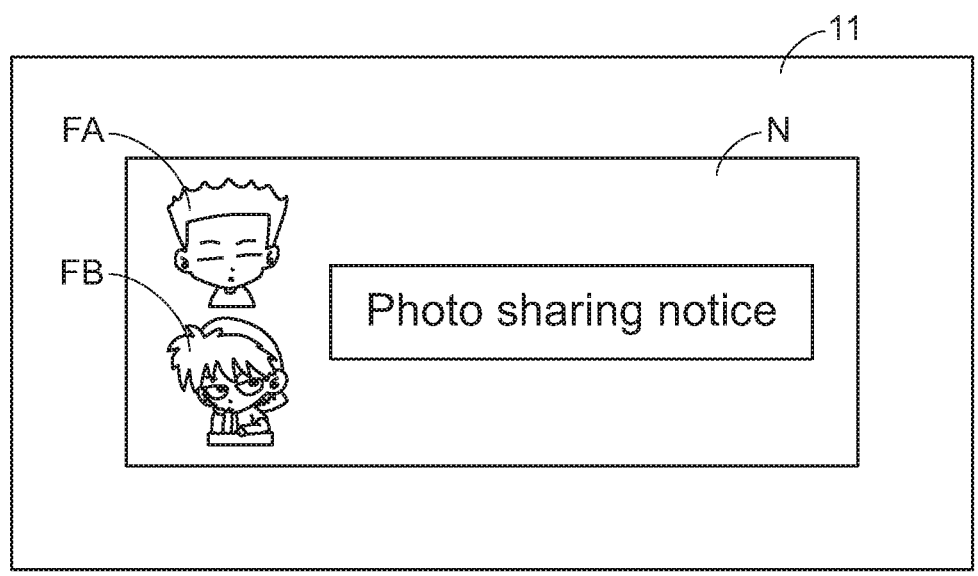
FIG. 7 schematically illustrates a photo sharing notice shown on the user interface of the photo browser in the photo sharing system of the present invention.

After the photos to be shared to the persons B and D are received by the photo sharing platform 20, the sharing notification module 22 will issue a photo sharing notice to the persons B and D. Another electronic device with the photo browser 10 may be operated by the person B to be connected to the photo sharing platform 20 of the cloud server, so that the photo sharing notice is shown on the user interface 11 of the photo browser 10. As shown in FIG. 7, a photo sharing notice N is shown on the photo browser 10 of the electronic device of the person B. The photo sharing notice N contains the face images of the sharer A and the receiver B. By means of the photo sharing notice N, the receiver B may immediately realize that the photo sharer is the person A. Of course, the photo sharing notice N may be acquired by the person D in the similar manner.

In the photo sharing system of the present invention, since the photos are classified by the photo classification module 12, the efficacy of sharing information is enhanced. Alternatively, the photos may be successively browsed by the user, and the to-be-shared photos may be manually transmitted.

For performing the photo sharing operation through the photo sharing platform 20, the user needs to previously apply for a user account of the photo sharing platform 20. If the receiver has no user account of the photo sharing platform, the photo sharing notice may be sent to the receiver through an electronic mail box, a mobile phone short message or a social networking website account. Once the photo sharing notice is received by the receiver, the photos may be viewed by the receiver through any electronic device including the photo browser 10.

In the photo sharing system of the present invention, the browsing history of each photo is recorded in the photo browser 10. Moreover, as the photo is shared, the browsing history will be stored in the photo sharing platform 20. An example of the browsing history includes but is not limited to a name of a person who browses the photo (i.e. the persons who have viewed the photo), a name of the receiver who receives the photo (i.e. the he persons who have received the photo), a time length of browsing the photo in each browsing action, a name of a folder for storing the downloaded photo by the receiver (e.g. the folder name "My favorite", the folder name "Desktop", the folder name "Recycle bin" or other folder name), and the number of times the photo is re-shared. The time length of browsing the photo in each browsing action denotes the time period of browsing the photo by the receiver. If the time length of browsing the photo is relatively longer, it is presumed that the shared photo is liked by the receiver to a higher extent. If the photo is downloaded from the photo sharing platform 20 to the photo folder with the folder name "My favorite" or "Desktop", it means that he shared photo is liked by the receiver to a higher extent. Whereas, if the photo appears in the photo folder with the folder name "Recycle bin", it means that the shared photo is less liked by the receiver. Of course, after the photo is received by the receiver, the photo may be shared to other persons. The browsing history of re-sharing the photo will be recorded in the browsing history recording module.

The photo recommendation module 23 of the photo sharing platform 20 is used for gathering statistics and performing analysis on the browsing history of the photo, thereby generating at least one recommendation message. For example, if a photo containing the images of the persons A, B and C is only shared to one or more specified persons (e.g. the person C) according to the browsing history corresponding to the photo, the photo recommendation module 23 will issue a recommendation message to user. The recommendation message may inquire the user whether the photo will be issued to any of the persons contained in the photo. Alternatively, if the number of times a specified photo has been shared is greater than a specified value, the recommendation message may inquire the user whether the photo will be printed on a photo paper or not.

From the above description, the photo sharing system of the present invention utilizes a face recognition technology to classify the photos in order to provide the useful reference information to the user. Moreover, if the photo is a multi-person photo to be shared to many receivers, the efficacy of sharing photos will be largely enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A photo sharing system with a face recognition function, said photo sharing system comprising:
    a photo browser included in an electronic device for allowing that allows a user to browse plural photos by operating said electronic device, wherein said photo browser comprises:
    a user interface for showing that shows said plural photos;
    a photo classification module for classifying that classifies said plural photos according to face image contained in said plural photos, thereby generating a photo classification message, wherein said photo classification message includes at least one candidate receiver, wherein at least one photo is selected by said user according to said photo classification message, and transmitted to a specified candidate receiver which is selected by said user; and
    a photo transmission module for transmitting that transmits said photos; and a photo sharing platform included in a cloud server, wherein said cloud server is in communication with said electronic device through an internet, and said photo sharing platform comprises:
    a photo file management module for managing that manages at least one photo folder, wherein said photos are stored in said photo folder; and
    a sharing notification module for generating that generates a photo sharing notice to said receiver; and
    a browsing history recording module that records a browsing history of each photo, and said browsing history is transmitted to said photo sharing platform from said photo transmission module, wherein said photo sharing platform further comprises a photo recommendation module that gathers statistics and performing analysis on said browsing history of said photo, thereby generating at least one recommendation message, wherein said browsing history includes a name of a person who browses said photo, a number of times said photo is browsed, a time length of browsing said photo in each browsing action, a number of times said photo is downloaded to any electronic device, a name of a folder of any electronic device which stores said photo, and a number of times said photo is re-shared.

2. The photo sharing system according to claim 1 wherein said plural photos are classified by said photo classification module according to face images of persons included in said plural photos.

3. The photo sharing system according to claim 2 wherein if said plural photos are classified by said photo classification module according to said face images of said persons included in said plural photos, said face image of each person and at least one photo containing said face image of said person are shown on said user interface, wherein said face image of each person denotes said candidate receiver.

4. The photo sharing system according to claim 3 wherein when a face image is clicked by said user, at least one photo corresponding to said face image is transmitted from said photo transmission module to said corresponding candidate receiver.

5. The photo sharing system according to claim 1 wherein according to an area percentage of said face image relative to said photo, said photo classification module determines whether said photo is a self-portrait photo or a certificate photo.

6. The photo sharing system according to claim 1 wherein according to the amount of face images of persons contained in each photo, said photo classification module determines whether said photo is an individual photo or a multi-person photo.

7. The photo sharing system according to claim 1 wherein said photo browser further comprises a face address book creating module that allows said user to create a face address book, wherein said face address book includes information about a face image, a name, a telephone number, a user account of said photo sharing platform and plural name-related contact data.

8. The photo sharing system according to claim 7 wherein if said receiver has no user account of said photo sharing platform, said photo sharing notice is sent to said receiver through an electronic mail box, a short message or a social networking website account, wherein if said receiver has said user account of said photo sharing platform, said photo sharing notice is shown on a user interface of a photo browser of said receiver.

9. The photo sharing system according to claim 8 wherein when said photo sharing notice is shown on said user interface of said photo browser of said receiver, said photo sharing notice contains a face image of a photo sharer and a face image of said receiver.

10. The photo sharing system according to claim 1 wherein said photo browser further comprises a face address book creating module that allows said user to create a face address book, wherein said face address book includes information about face images, names, telephone numbers and plural name-related contact data.

* * * * *